United States Patent
Di Cocco et al.

(10) Patent No.: US 10,152,139 B2
(45) Date of Patent: Dec. 11, 2018

(54) AUTOCOMPLETION METHOD AND SYSTEM

(75) Inventors: Antonio Di Cocco, Rome (IT); Filippo Calá, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2394 days.

(21) Appl. No.: 12/097,415

(22) PCT Filed: Jun. 16, 2006

(86) PCT No.: PCT/EP2006/063289
§ 371 (c)(1),
(2), (4) Date: Mar. 8, 2010

(87) PCT Pub. No.: WO2007/068505
PCT Pub. Date: Jun. 21, 2007

(65) Prior Publication Data
US 2012/0159317 A1    Jun. 21, 2012

(30) Foreign Application Priority Data

Dec. 13, 2005    (EP) .................................... 05112043

(51) Int. Cl.
*G06F 3/023* (2006.01)
*G06F 17/27* (2006.01)

(52) U.S. Cl.
CPC .......... *G06F 3/0237* (2013.01); *G06F 17/276* (2013.01); *G06F 17/2735* (2013.01)

(58) Field of Classification Search
CPC ... G06F 3/0237; G06F 17/2735; G06F 17/276

USPC .................. 715/257, 261, 780, 789, 816
See application file for complete search history.

(56) References Cited

U.S. PATENT DOCUMENTS

| | | | |
|---|---|---|---|
| 4,330,845 A | | 5/1982 | Damerau |
| 4,805,222 A | * | 2/1989 | Young .................. G06F 21/316 382/115 |
| 5,557,686 A | * | 9/1996 | Brown .................. G06F 21/316 340/5.51 |
| 5,761,689 A | * | 6/1998 | Rayson et al. ................ 715/210 |
| 6,151,593 A | * | 11/2000 | Cho ........................ G06F 21/31 706/16 |
| 6,286,064 B1 | * | 9/2001 | King et al. ...................... 710/67 |
| 6,426,843 B1 | * | 7/2002 | Lamberts ............. G11B 5/5521 360/75 |

(Continued)

FOREIGN PATENT DOCUMENTS

| | | |
|---|---|---|
| JP | 55020539 | 2/1980 |
| JP | 5119892 | 5/1993 |

(Continued)

*Primary Examiner* — Eric J. Bycer
(74) *Attorney, Agent, or Firm* — Steven M. Greenberg, Esq.; Shutts & Bowen LLP

(57) ABSTRACT

An implementation of an auto-completion or auto-correction mechanism where a dictionary of entry list look-up is triggered by the expiry of a time limit between data entry events such as key-press events, where the value of the time limit is dynamically determined as a function of the entry rate. The time limit may be calculated for example on the basis of an average entry rate, and may include an extra margin value. The occurrence of look up triggering will therefore tend to be optimised to the present user's data entry rate.

4 Claims, 5 Drawing Sheets

(56) References Cited

U.S. PATENT DOCUMENTS

| | | |
|---|---|---|
| 6,744,422 B1 | 6/2004 | Schillings et al. |
| 7,382,359 B2* | 6/2008 | Griffin .......................... 345/169 |
| 2004/0059950 A1* | 3/2004 | Bender ................. G06F 21/316 726/5 |
| 2004/0163032 A1 | 8/2004 | Guo et al. |
| 2004/0187037 A1* | 9/2004 | Checco ................... G06F 21/31 726/7 |
| 2005/0015176 A1* | 1/2005 | Harada ............ G05B 19/41845 700/121 |
| 2005/0192846 A1* | 9/2005 | De Zwart ............. G06F 19/322 705/3 |

FOREIGN PATENT DOCUMENTS

| | | |
|---|---|---|
| JP | 8147282 | 6/1996 |
| JP | 9325959 | 12/1997 |
| JP | 11212705 | 8/1999 |
| JP | 2002-007390 A | 1/2002 |

\* cited by examiner

AUTOCOMPLETION METHOD AND SYSTEM

CROSS-REFERENCE TO RELATED APPLICATIONS

This application is a Submission Under 35 U.S.C. § 371 for a U.S. National Stage Patent Application of International Application Number PCT/EP2006/063289, filed 16 Jun. 2006, and entitled AUTOCOMPLETION METHOD AND SYSTEM, which is related to and claims priority to European Application No. EP20050112043, filed Dec. 13, 2005, the entirety of each of which is hereby incorporated by reference.

FIELD OF THE INVENTION

The present invention relates to auto-completion mechanisms.

BACKGROUND OF THE INVENTION

The human interfaces of certain electronic devices or software environments offer an auto-completion function, where the interface attempts to identify a portion of information which might complete that already entered by a user, thereby saving the user the trouble of explicitly entering that remaining portion. This identification process is often carried out by reference to a list of possible complete entries, for example on the basis of past entries, or by reference to a standard library. Such mechanisms are often found for example in the interface of mobile telephones, where the interface is adapted to suggest a complete telephone number on the basis of a partially entered number or name, by reference to a list of contacts and previously dialled numbers. Another example is found in programming environments, where an auto-completion mechanism may suggest a substantial portion of standard code on the basis of the first few characters as entered by the user.

FIG. 1 shows an exemplary flow chart of a prior art approach. According to this approach, a key listener stores within a local variable the timestamp of the last key pressed event. When a new event is fired a new timestamp is taken and if the difference between the two values is less than the given interval the new character is considered as the continuation of the previous one and the new timestamp is updated.

The method begins for example at step 101, according to which the time stamp at the start of data input is recorded. At step 103 it is determined whether a key has been pressed, which step is repeated until a key press event is in fact detected. When such an event is detected, the time stamp of the event is recorded at step 105, and the interval between the last two time stamps determined at step 107. At step 109 it is determined whether the interval calculated at step 107 exceeds a predetermined interval or not, and in a case where is determined that the predetermined interval is not exceeded, the new data symbol is added to a record of the data symbols input so far before looping back to step 103. In a case where is determined that the predetermined interval is exceeded however, the method proceeds to step 113, at which a comparison of the record of keys pressed since step 101 with a collection of possible data inputs is carried out, and at step 115 possible completion values are suggested to the user, which may or may not be accepted. In any case, the fact that the time limit has expired is taken as indicating that the end of the data entry sequence has been reached, so that at step 117 the record of keys pressed since step 101 is emptied before looping back to step 103.

The following pseudo code provides an exemplary partial implementation of this method:

```
if ( (curTime – ivLastKeyTime) > TimeLimit )
    {
         Carry out search for auto-complete text
         Reset the current selection initializing it with the new Key.
    }
else
    {
         add new key to current selection
         Carry out search for auto-complete text
    }
```

SUMMARY OF THE INVENTION

According to the present invention there is provided a method for formulating a data input.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
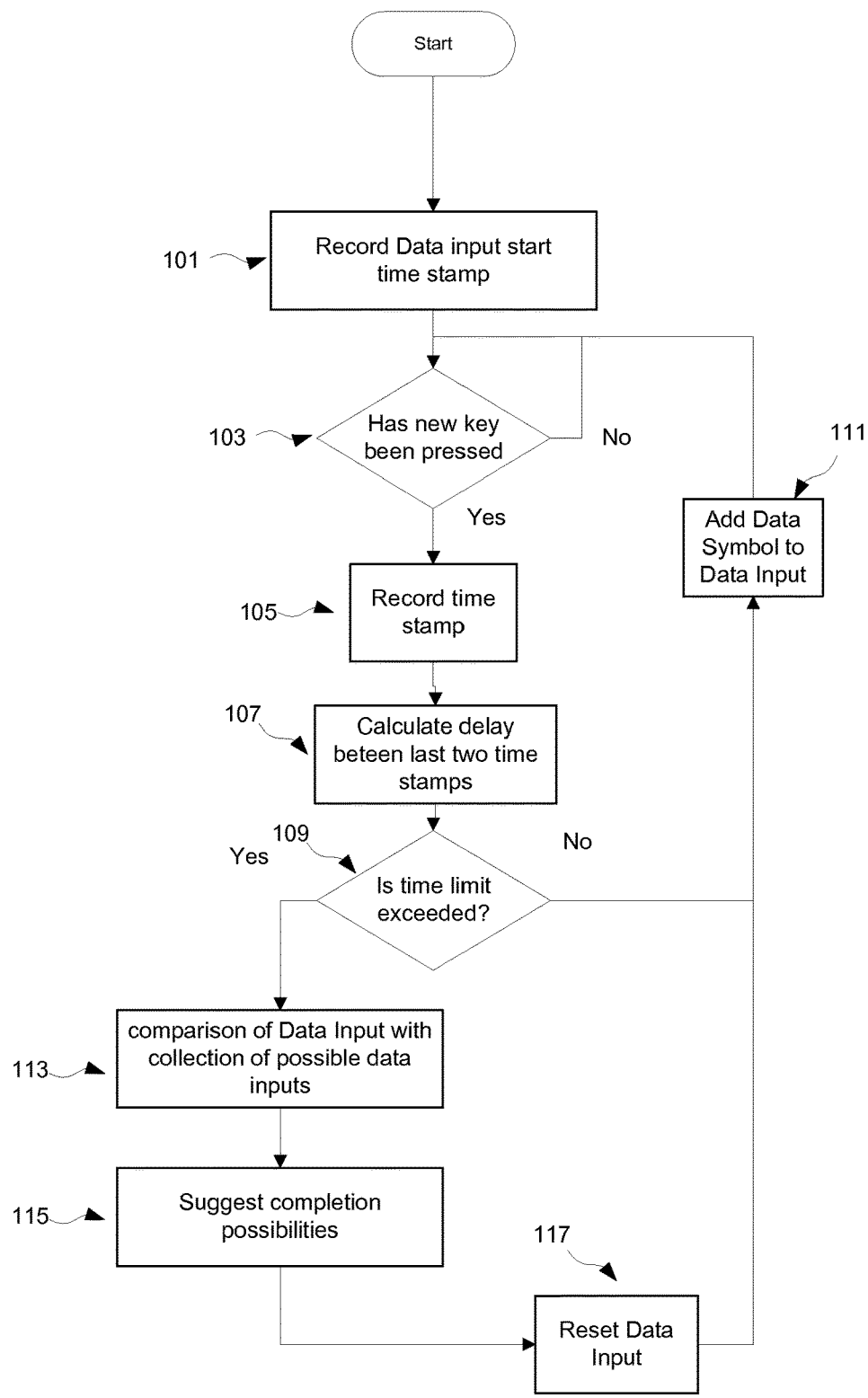
FIG. 1 shows an exemplary flow chart of a prior art approach.

A problem characteristic of auto-completion mechanisms as described above is that the time interval is either fixed or customizable by a configuration parameter, but once the interval has been read it is fixed. In fact however different users have differing data entry rates, and it could happen that either a user cannot make use of the auto-completion mechanism because he is too slow, can have some difficulty restarting the search because his data entries are too fast.

According to certain embodiments, the interval taken as reference may be varied, for example by learning from the user that is actually using the component. In other words, the time limit is a dynamically determined period. Two or more actual time interval values and the number of times the key has been pressed can be stored and used in calculating a time interval based on the present users actual data entry rate. In other words, there are provided the steps of:

waiting for a dynamically determined period after each data symbol entry, and where a further data symbol entry is received prior to expiry of said period, attempting to complete said data input by comparison of received symbols with a collection of possible data inputs, discarding all previously received symbols for the purposes of future comparisons if no further data symbol is received prior to expiry of said period, wherein the dynamically determined period is calculated as a function of the interval between previous data symbol entries.

The value of the Time Interval can be permanently stored when the application is closed, so that it will be possible to retrieve it when the application is restarted. This offers the advantage that an optimised value determined in a previous session can be taken as a starting point for a new session, which will likely shorten the average time required to tune the time limit value for the new session.

Preferably, the dynamically determined period is calculated by determining an average of the time intervals between a plurality of previous data symbol entries. An average can be determined using simple circuits or software routines, thereby restricting the costs or overheads of implementation. Still more preferably, the dynamically determined period is calculated by determining an average of the time intervals between a plurality of consecutive data symbol entries. This allows for further simplified circuitry or software routines, for example in terms of the size of the buffer or memory allocation required, thereby further restricting the costs or overheads of implementation. Still more preferably the dynamically determined period is calculated by determining an average of the time intervals between a plurality of immediately precedent consecutive data symbol entries. This allows for still further simplified circuitry or software routines, for example in terms of the size of the buffer or memory allocation required, thereby further restricting the costs or overheads of implementation. Still more preferably the dynamically determined period is calculated by determining an average of the time intervals between the three immediately precedent consecutive data symbol entries. This allows for still further simplified circuitry or software routines, for example in terms of the size of the buffer or memory allocation required, thereby further restricting the costs or overheads of implementation.

Preferably, the time interval includes a Margin or Delta quantity so as to allow for a degree of variation on the users data entry rate.

The margin or delta value may be for example a percentage of the time interval, an exponent of the time interval, a fixed quantity or a value determined by any other means. In a case where a percentage value is used, the delta value will vary with the time interval variation, increasing when the time interval increases and decreasing when the time interval decreases. Adopting a fixed delta value on the other hand would allow a large variation if the time interval is a small value, and allow smaller variation when time interval is large.

In this way the time interval within which two keys will be considered as belonging to the same text can be customized as a function of user typing frequency.

Thus the margin value may be for example a fixed value, a variable value, and may be a real multiple of the average value.

Figure 2:
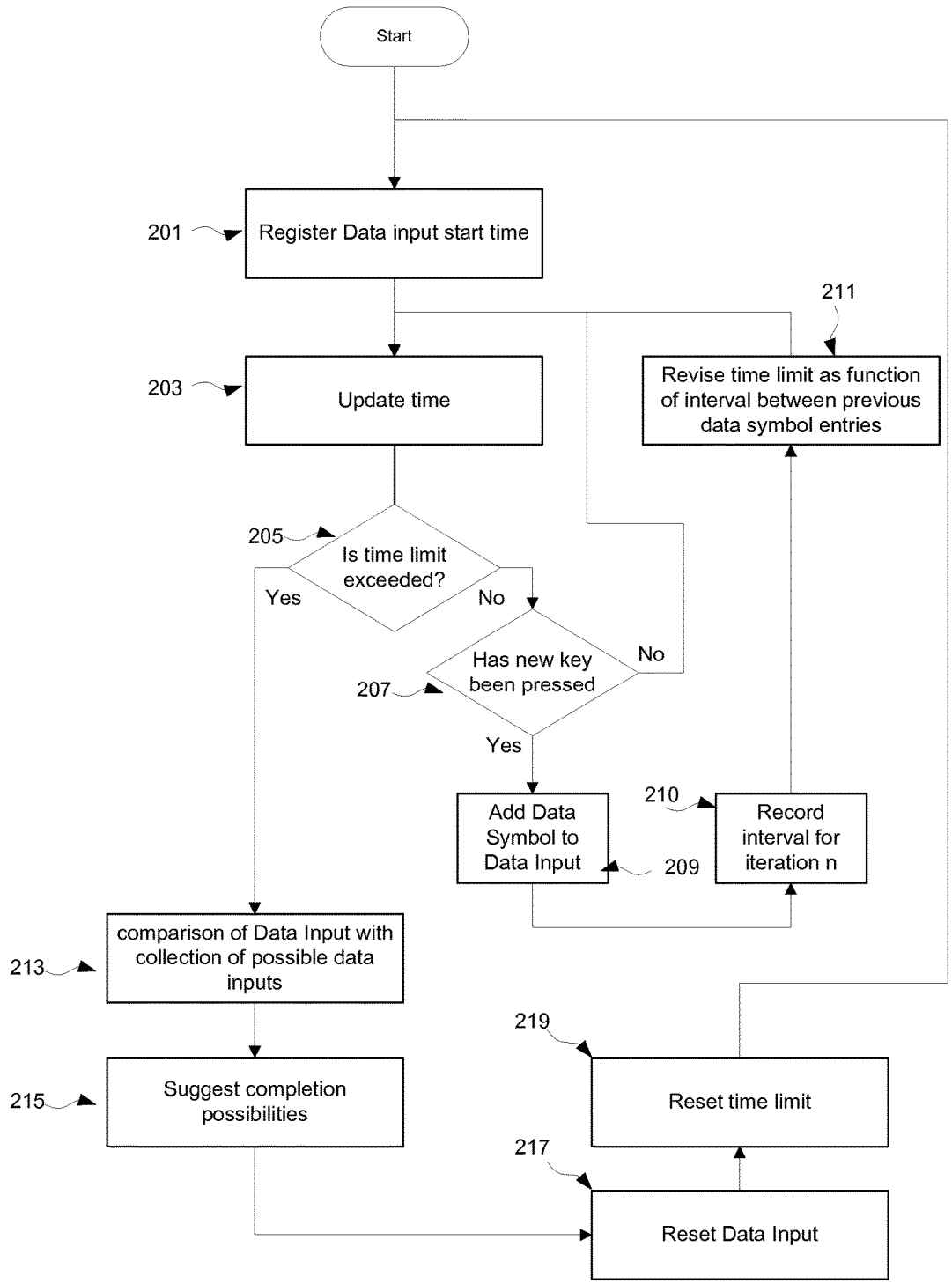
FIG. 2 shows a first embodiment.

FIG. 2 shows a first embodiment. According to the first embodiment, an evaluation of the average key press time is maintained. A pause longer than this average period by a given margin is interpreted as indicating the beginning of a new word. The entries made since the last pause are collected and compared in each iteration to a dictionary with a view to identifying and proposing auto-completion possibilities.

For example, each iteration the last two key press delays are averaged and added to a margin value Δ to determine a time limit l. e.g.

$$l = ((t_n + t_{n-1})/2) + \Delta$$

The following pseudo code provides a simple implementation.

```
AverageDelay = ((PreviousDelay + PrePreviousDelay)/2)
TimeLimit = delta + AverageDelay
if ( (curTime - ivLastKeyTime) > TimeLimit )
    {
            Carry out search for auto-complete text
        Reset the current selection initializing it with the new Key.
    }
else
    If keyvalue <> ""
    {
            add new key to current selection
            Carry out search for auto-complete text
    }
    PrePreviousDelay = PreviousDelay
    PreviousDelay = curTime - ivLastKeyTime
```

The method as shown in FIG. 2 begins for example at step 201, according to which the time at which processing starts is recorded. At step 203, the time value is updated, and at step 205 the difference between the start time recorded at step 201 and the present time as determined at step 203 is compared to a time limit value. If it is determined that the time limit has not yet expired, that is, the difference between the start time recorded at step 201 and the present time as determined at step 203 is less than the predetermined time limit value, the method proceeds to determine whether a key has been pressed at step 207. If it is duly determined that a key has been pressed, the value of the key is added to a record of keys pressed since step 201, at step 209. The interval value determined at step 205 is recorded at step 210, and used at step 211 to revise the time limit as a function of the interval between previous data symbol entries. The process then loops back to step 203. If at step 207 it is determined that no new key has been entered the method simply loops back to step 203. If on the other hand it is determined at step 205 that the predetermined time limit has been exceeded, that is, the difference between the start time recorded at step 201 and the present time as determined at step 203 is more than the predetermined time limit value, the method proceeds to step 213, at which a comparison of the record of keys pressed since step 201 with a collection of possible data inputs is carried out, and at step 215 possible completion values are suggested to the user, which may or may not be accepted. In any case, the fact that the time limit has expired is taken as indicating that the end of the data entry sequence has been reached, so that at step 217 the record of keys pressed since step 201 is emptied, before looping back to step 201.

Figure 3:
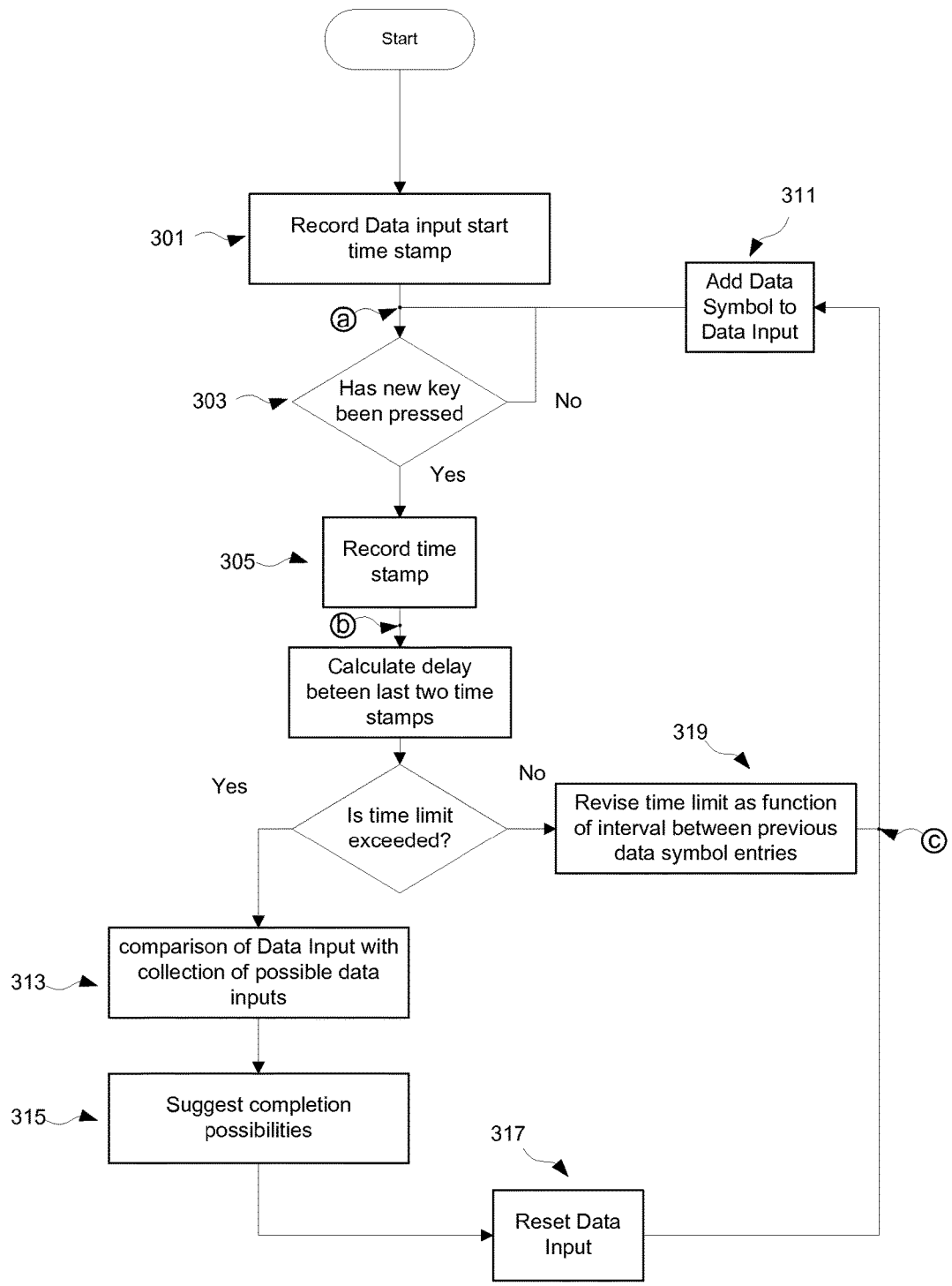
FIG. 3 shows a second embodiment.

FIG. 3 shows a second embodiment. According to this second embodiment, an evaluation of the average key press time is maintained. A pause longer than this average period by a given margin is interpreted a belonging to a search phrase. The entries made since the last pause are collected. Once a pause is detected exceeding the time limit, the entries collected are compared to a dictionary with a view to identifying and proposing auto-completion possibilities. This approach is particularly suited to situations in which a user enters a part of a larger text or arbitrary entry sequence and then waits for the auto-completion system to complete it.

The method begins for example at step 301, according to which the time stamp at the start of data input is recorded. At step 303 it is determined whether a key has been pressed, which step is repeated until a key press event is in fact detected. When such an event is detected, the time stamp of the event is recorded at step 305, and the interval between the last two time stamps determined at step 307. At step 309 it is determined whether the interval calculated at step 307 exceeds a predetermined interval or not, and in a case where is determined that the predetermined interval is not exceeded, the new data symbol is added to a record of the data symbols input so far.

As this stage, the time limit as applied at step 309 is revised as a function of the interval between previous data symbol entries at step 319. Preferably, as discussed above, the new time limit is an average of preceding intervals between time stamps, plus a delta value.

Once the time limit value has been revised at step 319 the method loops back to step 303. In a case where is determined that the predetermined interval is exceeded however, the method proceeds to step 313, at which a comparison of the record of keys pressed since step 301 with a collection of possible data inputs is carried out, and at step 315 possible completion values are suggested to the user, which may or may not be accepted. In any case, the fact that the time limit has expired is taken as indicating that the end of the data entry sequence has been reached, so that at step 317 the record of keys pressed since step 301 is emptied before looping back to step 303.

The following is a worked example of the process of the second embodiment, according to which the text "oldt" is typed into the system. In table 1 below, the "n" column relates to the iteration of the process, and the "t" and "s" columns provide the corresponding time interval and symbol values.

TABLE 1

| n | t  | s |
|---|----|---|
| 1 | 30 | o |
| 2 | 31 | l |
| 3 | 32 | d |
| 4 | 50 | t |

In this worked example, a fixed value of Delta ($\Delta$) of 10 is adopted.

Table 2 below shows the values at the nodes marked "a", "b", and "c" in FIG. 3 respectively, in are first iteration of the process with exemplary values.

TABLE 2

| | First Iteration, n = 1 | | | | |
|---|---|---|---|---|---|
| Node | $t_n$ | $t_{n-1}$ | l | Data symbol | Word (Data input) |
| a |    | 40 | 40 |     |     |
| b | 30 | 40 | 40 | "o" |     |
| c | 30 | 40 | 45 | "o" |     |

The Data input word "o" is retained in memory. In any case, the time limit l is revised as indicated at node c as follows:

$$l=(t_n+t_{n-1})/2+\Delta$$

$$l=(30+40)/2+10=45$$

TABLE 3

| | Second Iteration, n = 2 | | | | |
|---|---|---|---|---|---|
| Node | $t_n$ | $t_{n-1}$ | l | Data symbol | Word (Data input) |
| a |    | 30 | 45   |     | "o" |
| b | 31 | 30 | 45   | "l" | "o" |
| c | 31 | 30 | 40.5 | "l" | "o" |

The time limit l is revised as indicated at node c as follows:

$$l=(t_n+t_{n-1})/2+\Delta$$

$$l=(31+30)/2+10=40.5$$

TABLE 4

| | Third Iteration, n = 3 | | | | |
|---|---|---|---|---|---|
| Node | $t_n$ | $t_{n-1}$ | l | Data symbol | Word (Data input) |
| a |    | 31 | 40.5 |     | "ol" |
| b | 32 | 31 | 40.5 | "d" | "ol" |
| c | 32 | 31 | 35   | "d" | "ol" |

The time limit l is revised as indicated at node c as follows:

$$l=(t_n+t_{n-1})/2+\Delta$$

$$l=(32+31)/2+10=41.5$$

TABLE 5

| | Fourth Iteration, n = 4 | | | | |
|---|---|---|---|---|---|
| Node | $t_n$ | $t_{n-1}$ | l | Data symbol | Word (Data input) |
| a |    | 32 | 35 |     | "old" |
| b | 50 | 32 | 35 | "t" | "old" |
| c | 32 | 32 | 35 | "t" | "" |

In this case the time limit of 41.5 is exceeded, so the word "old" is looked up in the dictionary. Assuming no correction or completion is required, as is here the case, the word "old" will be accepted, and the data input buffer will be cleared for the next word. As can be seen at node "a" of the fifth iteration, the data input buffer has been initialised with the letter "t" as detected in this iteration.

According to this embodiment, the time limit is not revised during this iteration, as this would involve including an unduly large value due to a deliberate pause in the time limit. On the other hand, depending on the degree of variation in the users rate, or where a new user takes over having a significantly lower typing rate, i.e. greater than the margin allowed by the delta value, this approach may cause a deterioration in performance, in which case it may be desirable to include all delay values in time limit calculations. A still further approach would be to include time limits recorded at the end of short words, such as one letter words, which would mean that in a case where the time limit was set too low for a new user, all entries would be registered as one letter words, whose delays would be incorporated in the time limit average, thus leading to a rapid increase in the time limit value.

TABLE 6

| | | Fifth Iteration, n = 5 | | |
| Node | $t_n$ | $t_{n-1}$ | l | Data symbol | Word (Data input) |
| --- | --- | --- | --- | --- | --- |
| a | | 32 | 35 | | "t" |
| b | 50 | 32 | 35 | "t" | "t" |
| c | 32 | 32 | 35 | "t" | "t" |

As discussed above, the number of key presses over which the delay value is averaged may be greater than two. According to a development of this, the process may be designed so at to disregard a first key press failing to meet the time limit for these purposes. Accordingly a long average may be determined spanning several words without the average being artificially made longer by taking into account the pause between words.

Figure 4:
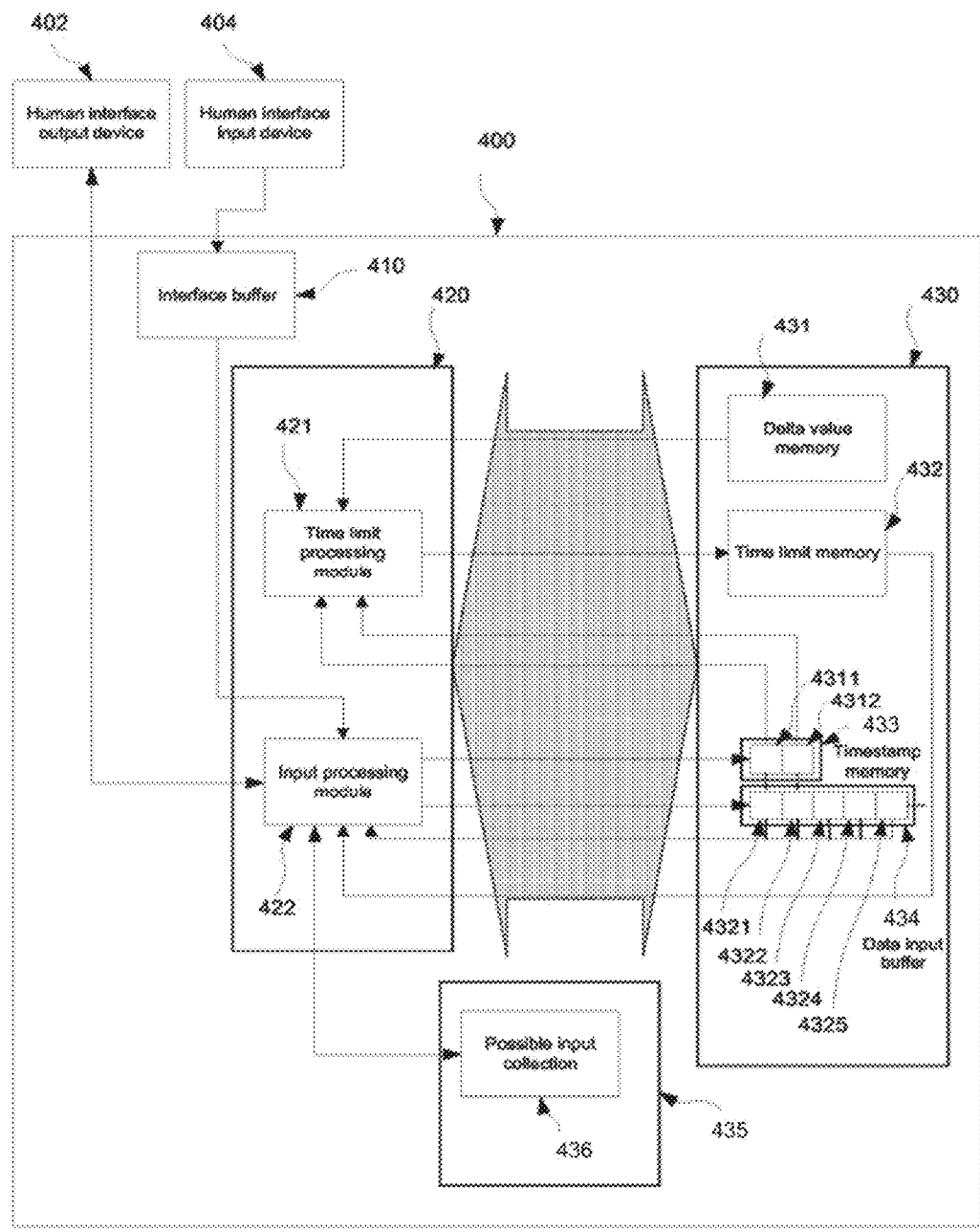
FIG. 4 shows a possible hardware configuration suitable for implementing the present invention.

FIG. 4 shows a possible hardware configuration suitable for implementing the present invention. According to this configuration there is provided a conventional computer system having a Human Interface input device 404 such as a keyboard, mouse, touchpad, voice recognition system etc, and a human interface output device 402, such as a video display unit or loudspeaker. These two interfaces communicate with a computing unit 400 which according to a conventional architecture comprises a CPU 420, a memory 430 and a bulk storage device 430, such as a hard disk drive. There is additionally provided an interface buffer 410 which receives data input by the user to the Human interface input device 410.

In order to implement the above described embodiments, the processor 420 executes an input processing module 422 which retrieves input symbols from the interface buffer 410, and adds the retrieved value 4321, 4322, 4323, 4324, 4325 to an area of said memory 430 designated as a data input buffer 434, along with a corresponding timestamp value which added to an associated area of said memory designated as timestamp memory 433. The input processing module 422 also performs the step of comparing time stamp values so as to determine the interval since the last character input, and retrieves a time limit value from a part of said memory 430 designated as time limit memory 432, for comparison with the interval. Finally, the Input processing unit performs a function of interrogating a collection of possible inputs 436 stored in the mass storage device 435, and presents possible correction or auto completion values to the user by means of the human interface output device 402.

The processor 420 further implements a time limit processing module 421, which performs the function of retrieving time stamp values 4311, 4312 from the time stamp memory 433 and if required a delta value from an area of the memory 430 designated as delta value memory 431, in order to re-evaluate the time limit value in accordance with the invention, and to store the new value in the time limit memory for retrieval by the input processing module 422.

Clearly, the order in which the respective tasks are implemented, and the manner in which they are carried out will vary as a function of the actual embodiment to be implemented.

Any element may be realised in terms of hardware, firmware, software or a combination of any or all of these. Where software components are provided, they may be placed temporarily or permanently on a carrier, such as an optical disc such as a CD or DVD, a magnetic disc such as a hard drive or floppy disc, a memory device such as a flash memory card, EPROM, volatile memory unit etc., or an optical, electrical, radio or other transmission channel, for example for the purposes of distribution.

According to one embodiment, the system may revert to a conventional fixed period recognition system after a predefined training period, or may only use certain delay values, for example every second, third, or fourth etc. delay value. These approaches offer the benefits of adaptability to actual users without the long term overhead in terms of continually recalculating the time limit.

The present invention applies equally to error detection or corrections mechanisms whereby entered text is compared to a list to identify errors, and flag these to a user and/or propose or impose corrections.

Figure 5:
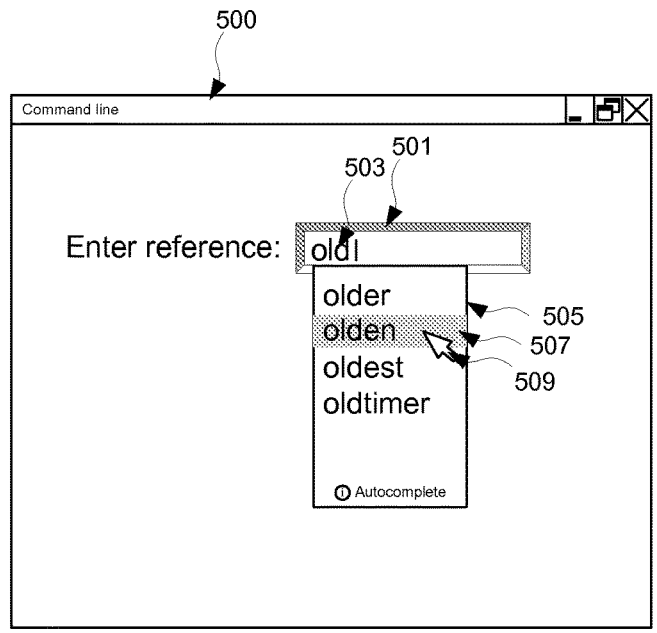
FIG. 5 shows a first application of the present invention.

FIG. 5 shows a first application of the present invention. As shown in this figure, in a window based graphical user interface a window 500 entitled Command line is open, which comprises a text box 501 bearing the label "enter reference". Text is entered by a user and appears in the text box 501. In accordance with the present invention above, once a time limit expires during text entry the text entered thus far, for example the text "old" as shown, is looked up in a list of possible entries, for example based on previous entries. A drop down box 505 appears with suggestions from which a user may select using the pointer 509 for example. As shown here the suggestion "olden" is highlighted, indicating that this item might presently be selected by the means appropriate to the GUI in question, for example by means of a mouse click.

Figure 6:
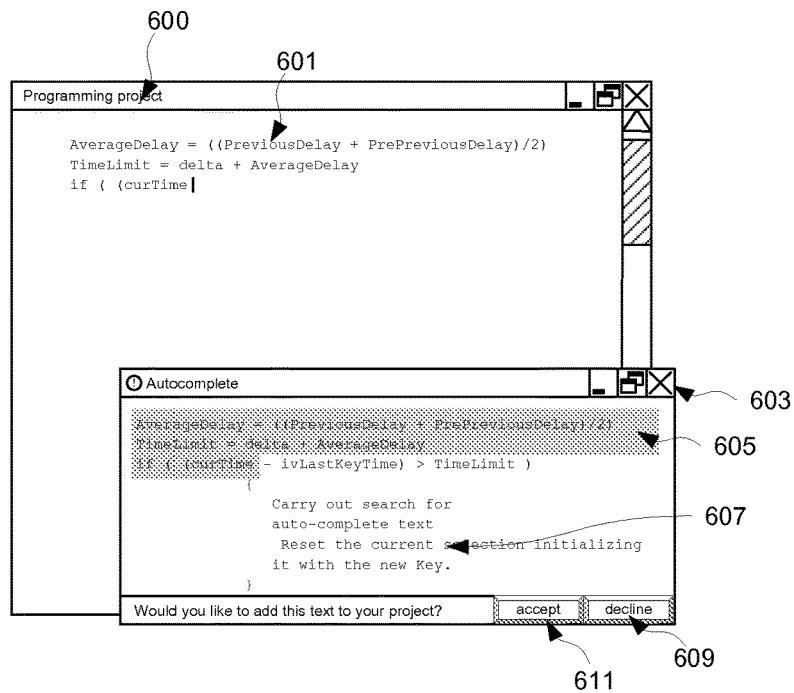
FIG. 6 shows a second application of the present invention.

FIG. 6 shows a second application of the present invention. As shown in this figure, in a window based graphical user interface a window 600 entitled "programming project" is open, which comprises a text field 601 in which programming code has been typed by a user. The system has been monitoring the users inputs in accordance with the present invention, and has registered a pause exceeding the time limit at the end of the string "curTime". Accordingly, the last portion of test
entered is looked up in a list of possible entries, for example based on a library of common code modules. A second window entitled "auto complete" 603 pops up containing the remaining part 607 of the code portion that the user has started, with the matched text 605 highlighted. Window 603 offers the user to accept or decline the proposed text by clicking an "accept" button 611 or a "decline" button 609.

According to a further embodiment there is provided an implementation of an auto-completion or auto-correction mechanism where a dictionary of entry list look-up is triggered by the expiry of a time limit between data entry events such as key-press events, where the value of the time limit is dynamically determined as a function of the entry rate. The time limit may be calculated for example on the basis of an average entry rate, and may include an extra margin value. The occurrence of look up triggering will therefore tend to be optimised to the present user's data entry rate.

The skilled person will appreciate that the present invention extends to all methods of data entry, including voice recognition, by means of a keyboard, a key pad, by means of a touch sensitive display or any other interface. The data symbols entered by this means my similarly be of any type consistent with auto completion, including symbols according to any character set whether derived from the roman or other alphabet, Arabic, roman or other numerals, mathematical symbols, musical notation, or indeed any arbitrary set of symbols for which an auto completion protocol can be defined. The entry may relate to individual glyphs such as letters, or pictograms forming part of larger ideograms, or otherwise deal with larger groups such as whole or partial words or phrases.

Correspondingly, a set of possible data inputs with reference to which auto complete or correction look-ups are made may comprise any set of data to which entered symbols may be compared, including dictionaries, compilations of frequently used texts, records of past entries, and indeed sources of data not specifically prepared for such a use such as databases, file storage systems or the internet.

The invention claimed is:

1. A computer implemented method for formulating a data input in conjunction with a user interface permitting the serial entry of data symbols, comprising the steps of:
   receiving, by a computer, from a user and through a keyboard user input device, a multiplicity of successively different keyboard stroke data entries of different keys of the keyboard at time intervals between successive ones of the different keyboard stroke data entries, with successive ones of the different keyboard stroke data entries representing an ordered string of symbols;
   measuring, by the computer, the time intervals between the entry of each different one of the successive keyboard stroke data entries, computing a delta value for each of the time intervals that varies with a variation between the time intervals by increasing when each of the time intervals increases and decreases when each of the time intervals decrease, and adding each delta value to a corresponding one of the time intervals;
   computing, by the computer, an average of the time intervals inclusive of the added delta values;
   determining, by the computer, that the adjusted average time delay exceeds a predetermined threshold value;
   responsive to the determination that the adjusted average time delay exceeds the predetermined threshold value, performing a dictionary lookup of the ordered string of symbols to obtain dictionary data related to the ordered string of symbols; and
   presenting, to the user and through a presentation device, the dictionary data in human understandable form and format.

2. The method of claim 1 wherein the average of the time intervals is computed based only upon the three immediately precedent consecutive keyboard stroke data entries.

3. The method of claim 1 comprising a further step of storing said average of the time intervals in non volatile memory and loading the average of the time intervals subsequent to a shut down and re-start of the computer system for use in a subsequent computing of the adjusted average delay.

4. A non-transitory computer readable storage medium having encoded thereon a computer program comprising instructions for carrying out the steps of:
   receiving, by a computer, from a user and through a keyboard user input device, a multiplicity of successively different keyboard stroke data entries of different keys of the keyboard at time intervals between successive ones of the different keyboard stroke data entries, with successive ones of the different keyboard stroke data entries representing an ordered string of symbols;
   measuring, by the computer, the time intervals between the entry of each different one of the successive keyboard stroke data entries, computing a delta value for each of the time intervals that varies with a variation between the time intervals by increasing when each of the time intervals increases and decreases when each of the time intervals decrease, and adding each delta value to a corresponding one of the time intervals;
   computing, by the computer, an average of the time intervals inclusive of the added delta values;
   determining, by the computer, that the adjusted average time delay exceeds a predetermined threshold value;
   responsive to the determination that the adjusted average time delay exceeds the predetermined threshold value, performing a dictionary lookup of the ordered string of symbols to obtain dictionary data related to the ordered string of symbols; and
   presenting, to the user and through a presentation device, the dictionary data in human understandable form and format.

* * * * *